June 12, 1962     E. A. GAUGLER     3,038,384
INDUCTION FIRING DEVICE FOR A ROCKET MOTOR
Filed Oct. 26, 1948     3 Sheets-Sheet 1

Inventor
E. A. Gaugler

By

Attorney

June 12, 1962 E. A. GAUGLER 3,038,384
INDUCTION FIRING DEVICE FOR A ROCKET MOTOR
Filed Oct. 26, 1948 3 Sheets-Sheet 2
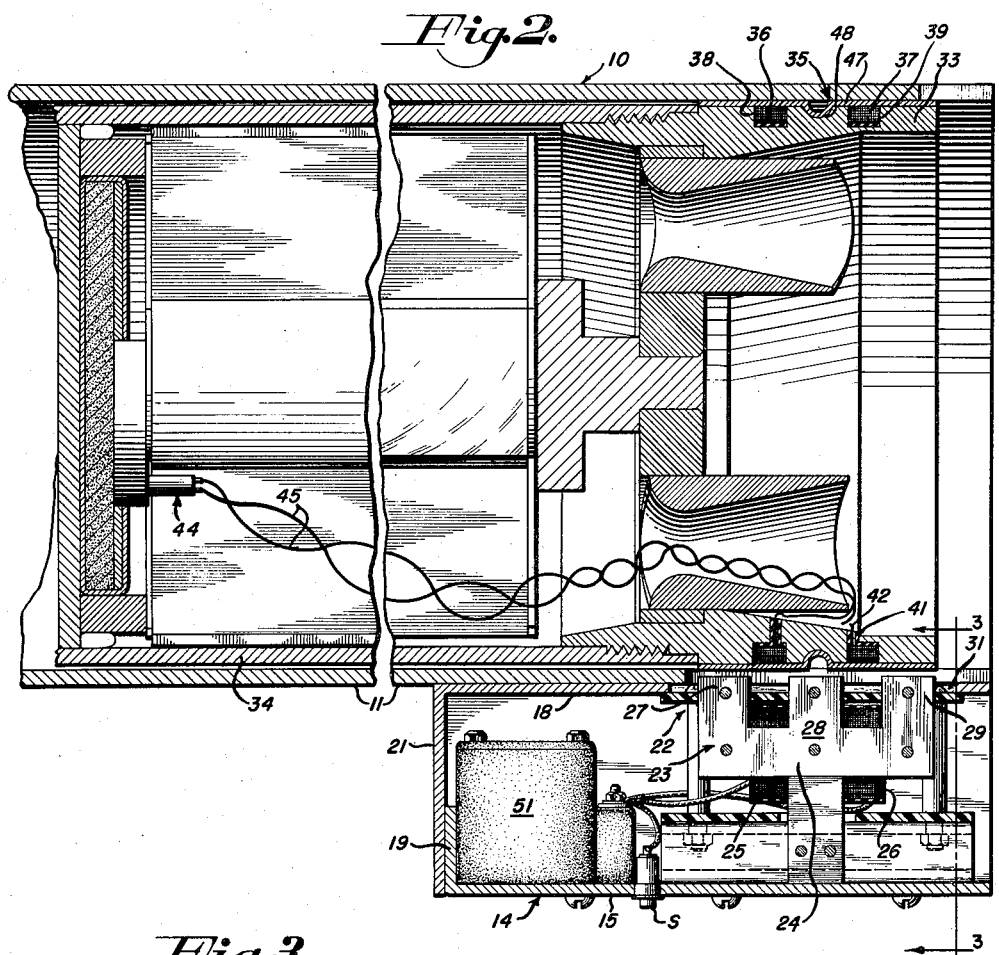
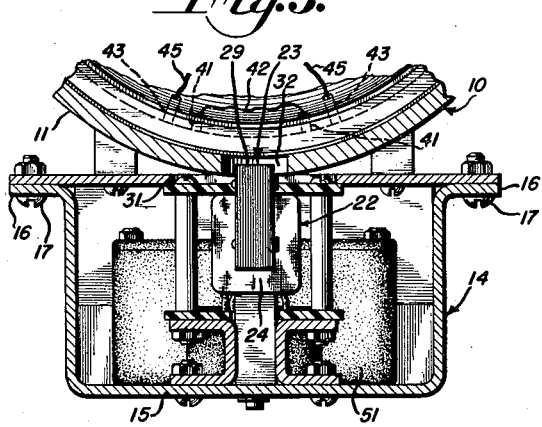
Inventor
E.A. Gaugler June 12, 1962 E. A. GAUGLER 3,038,384
INDUCTION FIRING DEVICE FOR A ROCKET MOTOR
Filed Oct. 26, 1948 3 Sheets-Sheet 3

Inventor
E.A. Gaugler

By
M.C. Hayes
Attorney

3,038,384
INDUCTION FIRING DEVICE FOR A ROCKET MOTOR

Edward A. Gaugler, 1748 Preston Road, Alexandria, Va.
Filed Oct. 26, 1948, Ser. No. 56,601
3 Claims. (Cl. 89—28)
(Granted under Title 35, U.S. Code (1952), sec. 266)

This invention relates to an ignition device and more specifically, the invention pertains to an induction ignition device for a spin stabilized rocket and adapted to fire the squib inductively thereby to initiate ignition of the rocket motor.

Heretofore the direct electrical contact method employed for firing a rocket motor initiating device has not proven entirely satisfactory for the reason that a pair of electrical contacts adapted to make direct contact with the rocket to establish a firing circuit to the motor initiating device of the rocket when the rocket was placed within the launcher would at times be defective due to the corrosive action thereon caused by the salt spray and high temperature to which the contacts are subjected as the propellant charge is ignited and the products of combustion therefrom are exhausted from the nozzle end of the rocket and deposited upon the aforesaid contacts as the rocket is propelled along the launcher or tube, as the case may be, by the propellant charge.

In accordance with the present invention an induction type firing device has been devised wherein the foregoing difficulties of the prior art devices have been overcome by the provision of an igniting device for inductively firing the rocket squib by a transfer of energy from suitable means supported on the launcher to complementary means arranged on the rocket without making direct electrical contact between the component parts on the aforesaid launcher and rocket, a firing impulse being transferred from the launcher to the motor initiating device in the rocket as a control switch in the firing circuit arranged on the launcher is closed. The induction firing device is provided with an energizing unit having a primary coil thereon, the unit being supported on the launcher in such a manner as to have one end of the pole or pole pieces of the energizing unit, as the case may be preferably but not necessarily, spaced approximately 1/16 of an inch from the rocket nozzle ring member and positioned in predetermined spaced relation with respect to two sections of an oppositely connected secondary coil arranged on the ring member or nozzle plate of the rocket. By reason of this arrangement, when the energizing unit is momentarly energized, a strong gradient field is caused to link the secondary coils and generate a current therein sufficient to fire the motor initiating device.

One of the objects of the present invention is the provision of a new and improved firing device for initiating ignition of a rocket motor inductively.

Another object is to provide a new and improved induction firing device for a rocket motor in which the electrical energy sufficient to fire the rocket squib is transferred from the launcher to the rocket without physical contact between the energy transfer elements respectively arranged on the rocket and launcher.

Another object is to provide a new and improved induction firing device for a rocket motor comprising an arrangement for storing electrical energy and converting at will the electrostatic energy to electromagnetic energy thereby to initiate ignition of the rocket motor.

A further object is to provide a new and improved induction firing device for a rocket motor having complementary means arranged respectively on the rocket and launcher therefor and adapted to be inductively coupled in such a manner as to pick up electrical energy of sufficient intensity to initiate ignition of the rocket motor.

An additional object resides in the provision of a new and improved inductively coupled system for firing a rocket in which spurious firing of the rocket in response to stray electromagnetic fields is prevented.

Other objects and many of the attendant advantages of this invention will be readily appreciated as the same becomes better understood by reference to the following detailed description when considered in connection with the accompanying drawings wherein:

FIG. 2 is an enlarged fragmentary sectional view of the induction firing device of FIG. 1;

FIG. 3 is a fragmentary sectional view taken on the line 3—3 of FIG. 2.

Figure 1:
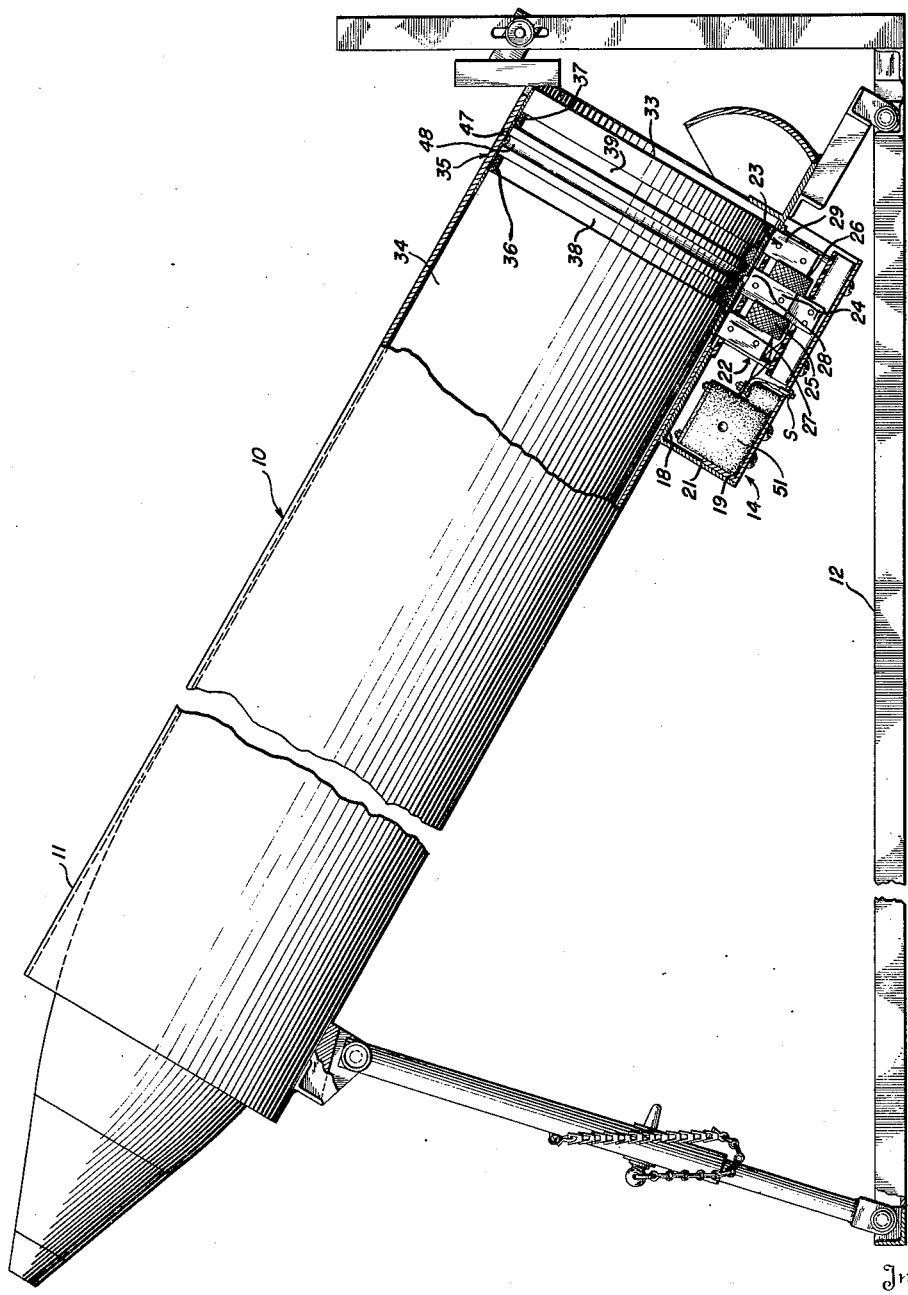
FIG. 1 is a view in side elevation and partially broken away of a rocket and rocket launching tube according to a preferred embodiment of the invention and showing the manner in which the secondary and primary coils are respectively arranged thereon.

Referring now to the drawings wherein like reference characters designate like parts throughout the several views and more particularly to FIG. 1 thereof a rocket launcher is generally indicated by the numeral 10, the launcher comprising a launching tube 11, adjustably supported in the usual manner on a base member 12. Arranged on one end of the tube 11 is a casing 14 composed of non-magnetic material such, for example, as the type known in the trade as "18–8" stainless steel, the casing comprising a substantially U-shaped member 15 composed of any non-magnetic material suitable for the purpose such, for example, as "18–8" stainless steel or the like and having a pair of flanges 16 respectively formed on the side walls thereof. Arranged on the casing 14 and secured to the flanges 16 as by bolts 17 is an L-shaped cover 18. As shown on FIG. 2 the casing and cover have respectively formed thereon flanges 19 and 21 thereby to close one end of the U-shaped member in such a manner as to prevent the products of combustion upon ignition of the rocket motor from being exhausted onto the energizing unit generally indicated by the numeral 22 as the rocket is propelled along the launching tube by the exhaust of the aforesaid products of combustion through the usual nozzle arrangement employed with a spin stabilized rocket, FIG. 2.

The energizing unit 22 comprises an E-shaped laminated core 23 composed of any material suitable for the purpose such, for example, as silicon steel, or the like. The leg 24 of the core has a split primary coil arranged thereon, the coil sections being indicated by the reference characters 25 and 26, the coil 25 being wound on the leg 24 in opposition with respect to coil 26.

As more clearly shown on FIG. 2, the pole pieces 27, 28 and 29 are integrally formed with the leg 24 of the core and extend through slots 31 and 32 respectively formed in the casing 14 and tube 11, the end portions of the aforesaid poles being preferably, but not necessarily, disposed approximately 1/16 of an inch from the rocket nozzle ring 33 when the rocket is arranged in the launching tube 11 and about to be fired therefrom. The ring is preferably composed of ferromagnetic material, the ring being secured to the rocket body 34 in any suitable manner such, for example, as threading the parts together, FIG. 2.

The ring 33 has arranged thereon a gradiometer unit generally indicated by the reference character 35, the unit comprising a pair of spaced coil sections 36 and 37, one coil section being disposed within a groove 38 formed in the ring 33 and wound thereabout in one direction, the other coil section thereof being disposed within a groove 39 formed in the ring and wound in the opposite direction. One end of each coil section respectively extends through a pair of grommets 41 disposed within the ring 33 and composed of insulating material, the connection between the coil sections being arranged within the ring and indicated by the numeral 42, and thus the coil sections 36 and 37 are connected in series, the other end of each coil section passing respectively through one of a pair of grommets 43 composed of suitable insulating material and disposed within the aforesaid ring and connected in series with the rocket squib 44 by conductors 45 as more clearly shown on FIGS. 2 and 3. By the aforesaid arrangement the secondary coil is prevented from becoming shorted on the rocket casing and a firing connection is established from the coil to the squib.

The gradiometer is constructed and arranged to prevent misfire caused by extraneous electromagnetic fields such, for example, as magnetic fields due to welding currents and the like. This is accomplished by reason of the aforementioned opposed connection of the secondary coils whereby the coils generate opposing voltages which substantially cancel each other in response to a stray field of low gradient which threads through the coils in the same direction. A strong gradient field, therefore, is required to fire the device and initiate ignition of the squib.

In firing, portions of the magnetic field generated by the energizing unit 22 which respectively thread through the secondary coils are caused to thread therethrough in opposite directions whereby the voltages induced in the coils add and thereby cause a flow of current sufficient to fire the detonator. This is accomplished by reason of the aforementioned opposed connections of primary coils 25 and 26 and the relative position of the energizing unit with respect to the gradiometer unit whereby the magnetic flux generated in E-shaped core 23 by the primary windings is caused to flow in the same direction in the center leg thereof and to pass in opposite directions through the secondary windings to or from the outer legs of the core respectively. The aforesaid arrangement is more clearly shown on FIGS. 2 and 3, wherein the center pole 28 of core 23 is positioned midway between the coil sections 36—37 of the secondary coil and the end pole pieces 27 and 29 are disposed to the side thereof, the pole pieces being spaced, as stated heretofore, approximately 1/16 of an inch from the rocket nozzle ring when the rocket is arranged within the launcher in position for launching. By this arrangement the air-gap between the aforesaid units is comparatively small and the sensitivity of the device is maintained at a high order and a low voltage at the voltage source is sufficient to fire the squib, it being understood, however, that the device will function should the air-gap be increased provided, however, that the field set up by the primary coil is of sufficient strength.

As more clearly shown on FIG. 3 the wall defining the bottom of each groove 38—39 in ring 33 has secured thereon in any convenient manner a layer of insulating material 46 suitable for the purpose such, for example, as fish-paper or condenser-paper upon which the coils 36—37 are wound.

In order to protect the secondary or gradiometer coil unit 35 from damage and also reduce susceptibility thereof to the effects from radar and the like a shield 47 composed of any nonmagnetic material suitable for the purpose such, for example, as "18–8" stainless steel is arranged about the nozzle ring and encloses the coil sections 36 and 37, the shield being secured to the ring FIG. 3 as by crimping the intermediate portion thereof into a groove 48 formed in the ring. The coil sections 36 and 37 are adapted to be coated with "Glyptal" before the shield 47 is secured to the nozzle ring for the purpose of protecting the coil sections against moisture and humidity.

Figure 4:
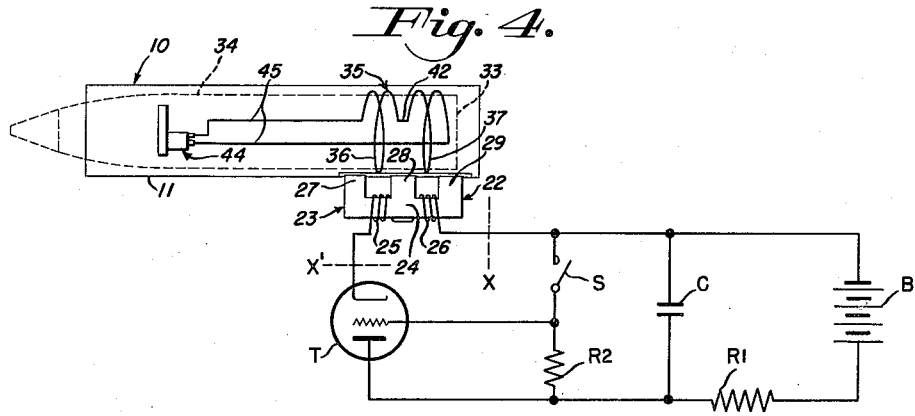
FIG. 4 illustrates in diagrammatic form a circuit arrangement suitable for use with the device of FIG. 1; and, FIGS. 5 and 6 are views similar to FIG. 3 showing alternative forms of the device applied to a launching rack.

Referring now to FIG. 4 there is shown thereon a diagrammatical circuit arrangement of the device of FIG. 1 including a firing circuit therefor, the circuit having a normally open switch S arranged therein and adapted to be closed and fire the rocket after the rocket has been placed in the tube 11.

The firing circuit preferably includes a suitable source of electrical energy such, for example, as the battery B which is arranged to charge the condenser C through the resistor R1 whereby sufficient electrical energy may be stored in the condenser and instantaneously released therefrom to energize the primary coil, thereby to fire the rocket. The use of a condenser in the manner disclosed reduces the power consumption and the dimensions of the primary coil.

The energy released from the condenser preferably is arranged to pass through a grid controlled gas type trigger tube T which has its main discharge path connected in series with the primary coil, this series arrangement being connected across the condenser. A resistor R2 is connected between the plate and a grid of the tube T and the aforesaid switch S is connected between the grid and cathode thereof whereby the tube is fired or rendered conducting when the switch is momentarily opened. The voltage across the switch, however, is low by reason of the voltage drop appearing across resistor R2 thereby providing an arrangement in which sparking at the switch contacts is greatly reduced.

When the tube T is fired the energy from condenser C is passed through the primary coil, whereupon electromagnetic energy is induced in the core 23, and, as the secondary and primary coils are inductively coupled together, the electromagnetic energy in core 23 is picked up by the gradiometer or secondary coils 36—37 thereby to induce a firing impulse therein of sufficient strength to fire the squib 44. Electrical energy thus is transferred from the energizing unit to the gradiometer unit without physical contact therebetween when the firing switch S is opened.

Arranged within the casing 14, FIG. 2, and secured thereto in any suitable manner is a container 51 having disposed therein the battery B and components of the firing circuit, the firing switch S being arranged on the casing 14 in such a manner as to be readily operated manually when desired. It will be understood, however, that, if desired, the switch S may be arranged on the launcher in such a manner as to be operated by the rocket as the rocket is placed within the launcher.

Figure 5:
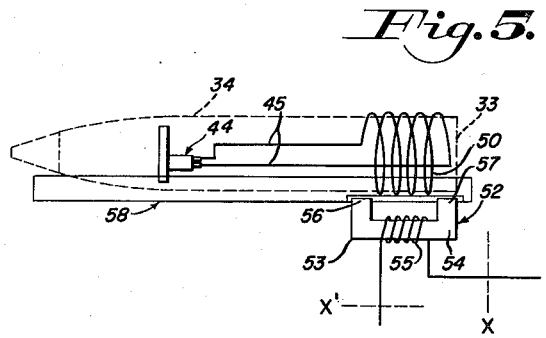

In the alternative form of the device shown on FIG. 5 a modified arrangement of the energizing unit is disclosed and indicated by the numeral 52. The unit comprises a substantially C-shaped laminated core 53 composed of any material suitable for the purpose such, for example, as silicon steel and having insulating spacers therebetween. The leg 54 of the core has a primary coil 55 arranged thereon and the pole pieces 56 and 57 of the core 53 extend through a slot formed in the launching rack 58, the end portions of the pole pieces being spaced a predetermined distance from the rocket nozzle plate and in proximate spaced relation with respect to the gradiometer unit 35 thereon. The firing circuit, employed with the arrangement of FIG. 4 is identical to the one shown in the preferred arrangement except that the gradiometer coil is replaced by a single coil 50, it being understood, however, when the tube T is fired the energy from condenser C is passed through the primary coil 55, whereupon electromagnetic energy is induced in the core 53 and as the secondary and primary coils are inductively coupled together the electromagnetic energy in the core is picked-up by the coil 50 thereby to induce a firing impulse therein of sufficient strength to fire the squib.

Figure 6:
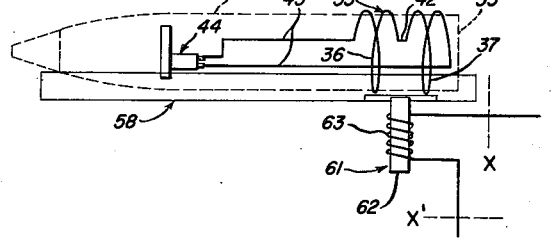

On FIG. 6 there is shown a still further modified form of the device in which a single pole energizing unit generally indicated by the reference character 61 is employed for use with the gradiometer unit 35. The energizing unit 61 comprises a laminated magnetic core 62 composed of any material suitable for the purpose such, for example, as silicon steel. Arranged on the core 62 is a primary coil 63. In this form of the device the energizing unit is arranged on the launching rack similar to the manner disclosed in FIG. 1, and having the core 62 of the energizing coil disposed midway between the two sections of the secondary coil, the axis thereof being disposed perpendicular to the axis of the gradiometer coil, one end portion of the core being spaced a predetermined distance from the nozzle plate when the rocket is in the launching rack in launching position thereby to obtain the maximum efficiency and sensitivity of the induction firing device. By reason of the aforedescribed arrangement, it will be apparent that the portions of the magnetic field generated by the solenoid which thread through the secondary coils respectively will thread therethrough in opposite directions whereby the secondary coils in this form of the device may also be connected opposing, thereby to prevent a firing voltage from being induced therein in response to stray fields.

As the firing circuit heretofore shown and described may be employed with the device of FIG. 5 further detailed description as to the operation is deemed unnecessary, it being understood that the magnetic field set up in the core 62 is picked-up by the gradiometer coil and a firing impulse of sufficient strength to fire the squib is induced therein.

While the invention has been described with particularity in reference to the several embodiments disclosed which produce satisfactory results, it will be apparent to those skilled in the art to which the invention pertains after understanding the invention, that the invention in its broader aspect could be carried out by other instrumentalities, and it is understood that the terms used in the claims are words of description and not of limitation except as necessitated by the prior art. Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. An induction firing device for a rocket motor comprising, in combination, a squib carried by the rocket for igniting the rocket motor, a pair of coils connected in series and arranged in spaced coaxial relation on the rocket, said coils being oppositely wound and connected to said squib whereby voltages generated therein in response to a stray magnetic field momentarily traversing the coils in the same direction substantially cancel thereby to prevent firing of the squib in response to said field, and selectively-actuated electromagnetic-energy generating means arranged on the launching rack for the rocket and disposed in proximity to said pair of coils for momentarily and simultaneously supplying to said coils a pair of oppositely poled electromagnetic fields whereby the voltages induced in the coils in response to said fields are in aiding relation and cause a flow of current of sufficient amplitude to fire the squib.

2. An induction firing device according to claim 1 but further characterized in that the means for momentarily setting up said electromagnetic fields comprises an E-shaped magnetic core having the center leg thereof disposed intermediate said coils and having a pair of primary exciting coils wound respectively about the vertical leg portions of the core in opposedly connected relation whereby said electromagnetic fields pass in the same direction through said center leg and through said coils in opposite directions to or from the outer legs of the core to produce said pair of oppositely poled electromagnetic fields.

3. An induction firing device according to claim 1 but further characterized in that the means for setting up said electromagnetic fields comprises a solenoid arranged on the rack so as to have the magnetic axis thereof extend between said coils and perpendicular to the axis thereof while the rocket is on the rack whereby the fields of the solenoid respectively threading through said coils pass in opposite directions therethrough.

References Cited in the file of this patent
UNITED STATES PATENTS

| | | |
|---|---|---|
| 2,406,870 | Vacquier | Sept. 3, 1946 |
| 2,459,854 | Swift | Jan. 25, 1949 |
| 2,640,417 | Bjork et al. | June 2, 1953 |